United States Patent
Reinsch et al.

(10) Patent No.: US 6,834,908 B2
(45) Date of Patent: Dec. 28, 2004

(54) CABRIOLET VEHICLE WITH A CONVERTIBLE TOP HATCH AND A ROLL BAR WHICH CAN BE COUPLED TO IT

(75) Inventors: Burkhard Reinsch, Kaufbeuren (DE); Thomas Schutt, Fuerstenfeldbruck (DE); Klaus Dullinger, Essenbach (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/378,662

(22) Filed: Mar. 5, 2003

(65) Prior Publication Data

US 2003/0218352 A1 Nov. 27, 2003

(30) Foreign Application Priority Data

Mar. 6, 2002 (DE) .......................................... 102 09 811

(51) Int. Cl.[7] .................................................. B60J 7/20
(52) U.S. Cl. ............................ 296/136.06; 296/107.08; 280/756
(58) Field of Search ........................ 296/136.06, 107.08, 296/107.18, 66; 280/756

(56) References Cited

U.S. PATENT DOCUMENTS

| | | | | |
|---|---|---|---|---|
| 4,557,502 A | * | 12/1985 | Scaduto et al. | 280/756 |
| 4,592,571 A | * | 6/1986 | Baumann et al. | 280/756 |
| 4,601,487 A | * | 7/1986 | Hoffman | 280/756 |
| 4,830,402 A | * | 5/1989 | Matthias et al. | 280/756 |
| 4,840,398 A | * | 6/1989 | Matthias et al. | 280/756 |
| 5,393,093 A | * | 2/1995 | Wunsche et al. | 280/756 |
| 5,622,382 A | * | 4/1997 | Zepnik et al. | 280/756 |
| 5,890,738 A | * | 4/1999 | Heiner et al. | 280/756 |
| 6,062,625 A | * | 5/2000 | Elelnrieder et al. | 296/66 |
| 6,296,278 B1 | * | 10/2001 | Zupancic et al. | 280/756 |
| 6,322,130 B1 | * | 11/2001 | Wanden et al. | 280/756 |
| 6,334,366 B1 | * | 1/2002 | Schuler et al. | 280/756 |
| 6,352,285 B1 | * | 3/2002 | Schulte et al. | 280/756 |
| 6,431,636 B1 | * | 8/2002 | Schutt | 296/107.18 |
| 2003/0075911 A1 | * | 4/2003 | Berges et al. | 280/756 |
| 2003/0178833 A1 | * | 9/2003 | Muller | 280/756 |
| 2003/0205891 A1 | * | 11/2003 | Nass | 280/756 |

FOREIGN PATENT DOCUMENTS

| | | | |
|---|---|---|---|
| DE | 38 26 788 A1 | | 2/1990 |
| DE | 4342400 | * | 2/1995 |
| DE | 4425954 | * | 11/1995 |
| DE | 197 14 104 C1 | * | 6/1998 |
| DE | 197 14 125 A1 | | 10/1998 |
| DE | 10152332 | * | 5/2003 |

* cited by examiner

Primary Examiner—Kiran Patel
(74) Attorney, Agent, or Firm—Nixon Peabody, LLP; David S. Safran

(57) ABSTRACT

For a cabriolet vehicle with a convertible top hatch which can be moved between a cover position and an open position for selectively covering and opening a convertible top compartment and with a roll bar which can be moved between a lowered position and a protective position and which can be coupled to the convertible top hatch for joint movement, a convertible top hatch transmission part is provided which transfers the driving force to the convertible top hatch which can be disengageably coupled to a roll bar movement part that produces movement apparatus of the roll bar so that roll bar is movement can be produced, simultaneously with motion of the convertible top hatch, that is in a different direction from that of the convertible top hatch during at least one segment of the motion of the convertible top hatch.

18 Claims, 10 Drawing Sheets

CABRIOLET VEHICLE WITH A CONVERTIBLE TOP HATCH AND A ROLL BAR WHICH CAN BE COUPLED TO IT

BACKGROUND OF THE INVENTION

1. Field of the Invention

The invention relates to a cabriolet vehicle with a convertible top hatch which can be moved between a cover position and an open position for selectively covering and opening a convertible top compartment and with a roll bar which can be moved between a lowered position and a protective position and which can be coupled to the convertible top hatch for joint movement.

2. Description of Related Art

A generic cabriolet vehicle is known from German Patent DE 197 14 104 C1. In the vehicle shown there, the convertible top hatch can be coupled directly to the roll bar via a journal to swing together, which journal is movably attached to the hatch in the transverse direction of the motor vehicle. The roll bar is made C-shaped, with two legs which are coupled to the motor vehicle sides and a cross brace which joins the two legs.

Since the roll bar is generally swung into its protective position from the vehicle rear to the vehicle front around an axis which runs in the transverse direction of the vehicle, the convertible top hatch must likewise execute such a swing motion as a result of the coupling to the roll bar which is shown in German Patent DE 197 14 014 C1. Aligned in its open position, the roll bar forms a barrier which must be overcome by the convertible top during the stowage process. This requires complex sequences of motion in space and time by the convertible top, the convertible top hatch and the roll bar.

The disadvantage in the known embodiment is that the motion of the convertible top hatch is fixed in terms of type and direction by the roll bar: It must swing jointly with the roll bar in the same direction and with the same direction of rotation.

SUMMARY OF THE INVENTION

The primary object of the present invention is to develop a cabriolet vehicle such that the convertible top can be retracted into the convertible top compartment of the vehicle and extended from it using simple sequences of motion.

By selectively coupling a convertible top hatch transmission part to the roll bar movement part, in place of the convertible top hatch itself, the convertible top hatch can be moved with greater independence from the roll bar. Movement of the convertible top into the convertible top compartment (retraction) or out of it (extension) can be enabled more easily than in the past. On the one hand, the roll bar can be raised when the convertible top is being retracted or extended so that an opening of the convertible top compartment that is as large as possible can be used for this purpose. On the other hand, the roll bar can be located in its lowered position over the opening of the convertible top compartment so that it does not occupy any volume in the vehicle interior.

The convertible top hatch transmission part can be connected directly or indirectly to the convertible top hatch. It is sufficient if driving force for moving the convertible top hatch is routed via it to the hatch.

Otherwise, in this application, the mobility of the part between two positions should also encompass the mobility of the part into any intermediate position between the two positions. The roll bar movement part is also called only the "movement part" below.

Although the movement part in accordance with the invention can be the roll bar itself, in one especially economical alternative, the movement part, for reasons of greater independence of movement from the convertible top hatch and the roll bar, is preferably a part which is coupled to the roll bar for transfer of force and/or motion, such as, for example, the connecting rod of a driving or kinematic mechanism.

Increased safety of the vehicle passengers can also be ensured according to one development of the invention in that the roll bar, in its lowered position, is coupled or can be coupled to a safety drive which provides the driving force for moving the roll bar into the protective position.

Likewise, it is possible for the coupling of the roll bar movement apparatus to the convertible top hatch transmission part to take place manually by the driver. This can be done in a structurally simple manner in that the convertible top hatch transmission part can be coupled to the roll bar movement part by a movable lock element. However, the driver, in particular, need not be concerned to which part the roll bar movement part is coupled, if the convertible top hatch transmission part is coupled to the roll bar movement part in a normal driving situation. As a result of the mobility of the lock element, the coupling between the roll bar movement part and the convertible top hatch transmission part can be released at any time as required. A normal driving situation, in contrast to the emergency situation, is defined as any normal traffic situation including a parking situation, in which there is no need to trigger the roll bar for safety reasons.

However, when the coupling of the convertible top hatch transmission part to the roll bar movement part as the convertible top hatch is being opened is produced by the motion of the convertible top hatch transmission part, the existing coupling between the convertible top hatch transmission part and the roll bar movement part need not be released first in order to move the roll bar into the protective position. This offers increased passenger safety.

In one preferred-embodiment, the cabriolet vehicle comprises a convertible top hatch transmission part which can be moved between a first end position which is assigned to the cover position and a second end position assigned to the open position, a roll bar movement part which can be moved between a first end position assigned to the lowered position and a second end position which is assigned to the protective position, and a safety drive transmission part which can be moved between a first end position which corresponds to the force preparation position of the safety drive for the roll bar and a second end position which corresponds to the activation position of the safety drive. The aforementioned function can be obtained, for example, in that the transmission parts and the roll bar movement part can be moved at least some distance with the same type of motion and the same direction of motion in movement in the direction from its first end position to the second end position. Different types of motion can be rotation and/or translation. It is noted that motion of the same type and direction need begin neither in the first end position nor end in the second end position of one of the parts.

Joint motion of the movement part with one of the transmission parts at a time can be easily and economically achieved by there being on the convertible top hatch transmission part and/or on the safety drive transmission part one driving means each for driving the roll bar movement part in the motion of the respective transmission part in the direction of the second end position. In one especially simple case the driving means can be made as a mechanical stop. The roll bar movement part can be pushed by the mechanical stop for joint motion by one of the transmission parts. This has the advantage that the safety drive transmission part, which generally triggers suddenly, can so to speak "overtake" the more slowly moving convertible top hatch transmission part, and thus, in an especially simple and reliable manner, can release the coupling of the motion of the roll bar movement part to the convertible top hatch transmission part at any time and can establish this coupling to the safety drive transmission part at any time.

However, in this type of coupling of motion, first of all, there is no coupling possibility for motion which sets the roll bar back into its lowered position. This can be achieved, for example, by the aforementioned lock element.

According to one advantageous development of the invention, the roll bar-convertible top hatch system can be made such that the lock element is made on the roll bar movement part. In this case, the roll bar movement part can be made such that the lock element can be moved between preferably positive engagement to the safety drive transmission part and a preferably positive engagement to the convertible top hatch transmission part. Thus, with the two transmission parts, secure coupling engagement can be selectively achieved by which there is also a reset possibility of the roll bar into the lowered position.

One prerequisite for automatic engagement of the lock element to the respective transmission part which entrains the movement part can be accomplished in that there is at least one gear mechanism on the lock element by which movement of the roll bar movement part and/or of the safety drive transmission part can be stepped up into motion which moves the lock element.

In one especially simple embodiment, the lock element can be made such that at least one angular surface is provided on the lock element, preferably for each transmission part an assigned angular surface. The angular surface is made as a gear mechanism, the surface normal of at least one angular surface having a component which is parallel to the direction of motion of the lock element and a component parallel to the direction of motion of the roll bar movement part out of the first end position.

Then, the transmission parts can be made such that the safety drive transmission part and/or the roll bar movement part has one acting surface each or can be coupled to one which is made for interaction with at least one angular surface of the lock element in order to thus cause the motion which moves the lock element. The active surface can be used, for example, as a slideway surface for the angular surface of the lock element. The part which has the acting surface can also be held in the roll bar movement part and can be coupled to one of the transmission parts or can be actuated by one of the transmission parts.

Reliable and permanent engagement of the lock element to one of the transmission parts can be implemented by there being a fixing means which fixes the lock element during motion of the roll bar movement part in the respective engagement position.

The fixing means can be made as a mechanical control especially easily and reliably, for example, such that the fixing means comprises a host of slide surfaces which run in the direction of motion of the roll bar movement part. These slide surfaces can be formed, for example, by a system of projections and grooves which fit into one another or by projections with contact surfaces which run parallel to one another and in the direction of motion of the movement part. The slide surfaces, of which there can be one on the lock element and another mounted on the body, can adjoin one another during the motion of the roll bar movement part, such that the body-mounted slide surface prevents displacement of the lock element out of its instantaneous engagement position.

Alternatively or in addition, it can be provided that the fixing means is formed by spring elements which tension the lock element into its engagement position.

To increase passenger safety in an emergency situation, the roll bar-convertible top hatch system can be developed such that there is a pull-back blocking part which, when the safety drive transmission part is not triggered, is locked in the pull-back release position in which it allows motion of the roll bar movement part in the direction toward the first end position, and which is unlocked by motion of the safety drive transmission part from its first end position in the direction to its second end position for movement into the pull-back blocking position in which it does not allow movement of the roll bar movement part in the direction to the first end position.

The motion of the pull-back blocking part when it is unlocked can be easily ensured by the pull-back blocking part being locked against pre-tensioning of the spring towards the pull-back blocking position in the pull-back release position.

A structurally simple and thus economical implementation of unlocking of the pull-back blocking part by the safety drive transmission part can be achieved by the safety drive transmission part being coupled in its first end position to the pull-back blocking part in its pull-back release position via a force transmission means, such as gearing or a rod.

The aforementioned advantageous effects can also be obtained on a generic motor vehicle by the roll bar and the convertible top hatch each being connected to a driving device which can be coupled to one another via a common control, and the convertible top hatch and the roll bar can be driven by the control and the respectively assigned driving devices into motion in directions which are different at least in segments. A space and/or time interval of joint motion of the convertible top hatch and the roll bar can be considered "in segments".

In the cabriolet vehicle in accordance with the invention, thus a process for stowing and unloading a cabriolet convertible top from a convertible top compartment which can be covered with a convertible top hatch is possible which is characterized in that at least in one segment of motion of the convertible top hatch, a roll bar is moved simultaneously with it in a direction of motion which is different from the direction of motion of the convertible top hatch.

The invention is explained by way of example with reference to the attached drawings using preferred embodiments.

BRIEF DESCRIPTION OF THE DRAWINGS

FIGS. 7a, 7b to 10a, 10b show graphic and schematic depictions of four different embodiments of a roll bar for a motor vehicle in accordance with the invention.

DETAILED DESCRIPTION OF THE INVENTION

Figure 1:
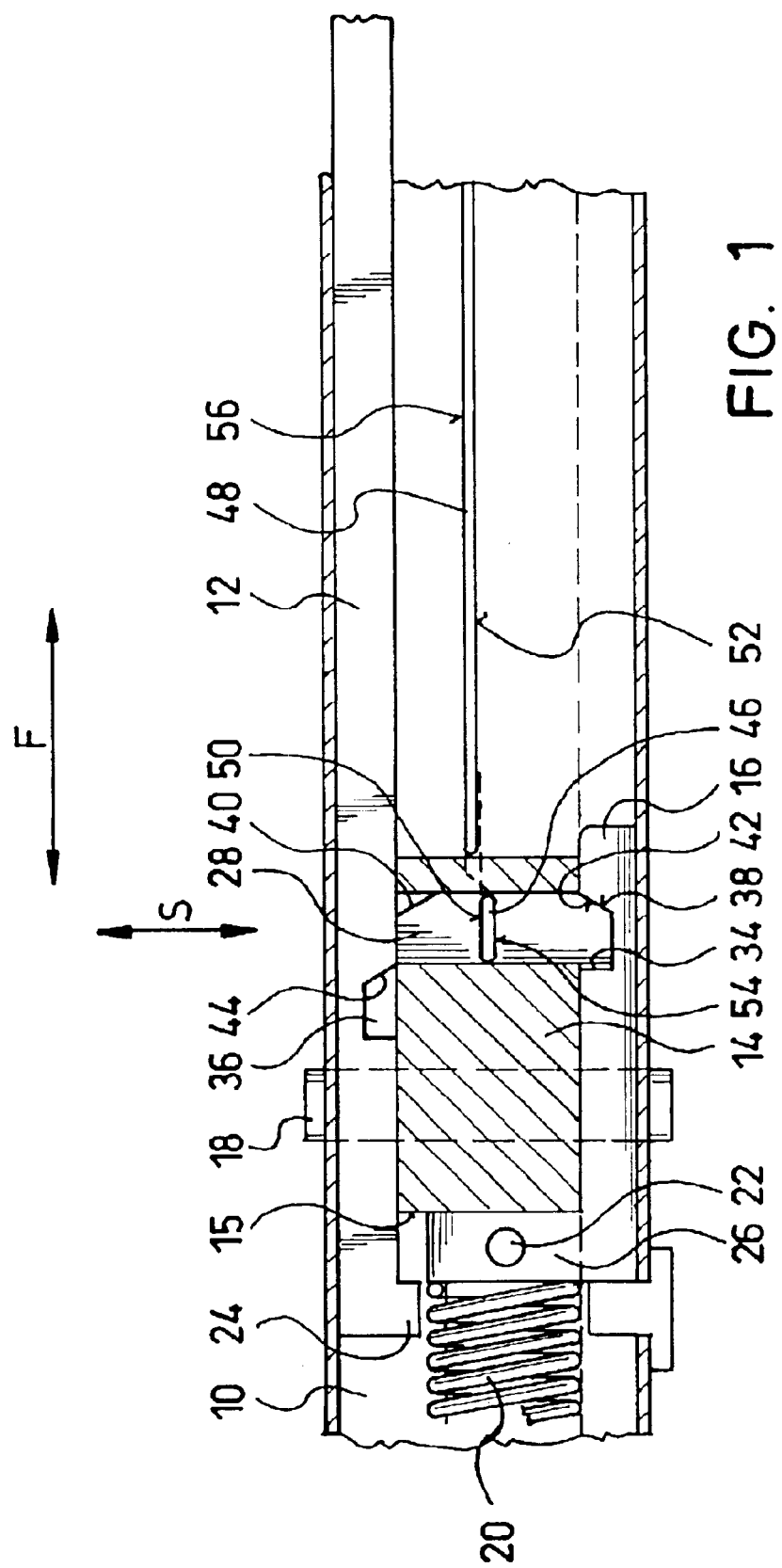
FIGS. 1 to 3 show a first embodiment of an arrangement in accordance with the invention with a convertible top hatch transmission part, a roll bar movement part and a safety drive transmission part in a first end position, an intermediate position and a second end position, respectively.

FIG. 1 shows a body-mounted guide rail 10 in which the convertible top hatch transmission part 12, the roll bar movement part 14 and the safety drive transmission part 16 are accommodated to be able to move in the directions of the double arrows F. The convertible top hatch transmission part 12 is connected via other connecting rods (not shown) to a movement drive (not shown) and a convertible top hatch (not shown). In the roll bar movement part, an axle journal 18 is accommodated which runs essentially in the transverse direction of the motor vehicle and which is pivotally coupled to a leg of the roll bar which is not shown in this figure.

The safety drive transmission part 16 is connected to a tensioned spring 20 as the safety drive for rapid motion of the roll bar out of its lowered position into the protective position. The safety drive transmission part 16 is held in position via a locking pin 22.

FIG. 1 shows the two transmission parts 12, 16 and the movement part 14 in their first end position, in which the convertible top hatch is closed, the roll bar is in its lowered position and the spring 20 is in its force readiness position.

On a lengthwise end area, the convertible top hatch transmission part has a projection 24 which, as the driving means, is used to drive the movement part 14 in the case of motion of the convertible top hatch transmission part 12 to the right in FIG. 1.

Likewise, on the end area of the safety drive transmission part 16 facing the spring 20, there is a projection 26 as the driving means. The projection 26 adjoins the end face 15 of the movement part 14. The projection 24 and the projection 26 project towards one another from their respective transmission parts 12, 16, but in their projecting lengths are dimensioned such that they can slide past one another.

In addition, in the movement part 14, there is a lock element 28 which can be moved in the direction of motion which is essentially orthogonal to the guidance direction F. This lock element 28 is made larger in its direction of motion S than the movement part 14 in this direction. Therefore, an end area of the lock element 28 always projects relative to the side boundary surfaces 30, 32 of the movement part 14, which surfaces run in the guidance direction F. In the example shown in FIG. 1, an end area of the lock element 28 projects into an engagement recess 34 of the safety drive transmission part 16. An engagement recess 36 of the convertible top hatch transmission part 12 which is made mirror symmetrically to the part 16 is offset in the direction of the spring 20 so that the convertible top hatch transmission part 12 blocks the motion of the lock element 28 in the direction of the convertible top hatch transmission part 12 in the FIG. 1 position.

In its end areas, the lock element 28 has angular surfaces 38, 40. These angular surfaces 38 and 40 are aligned such that their surface normal has a component in the direction of motion of the roll bar movement part 14 out of the first end position and a component in the direction of motion S of the lock element 28. The angular surface 38 interacts with a co-acting surface 42 which is made complementary to the angular surface 38 and which forms a part of boundary of the engagement recess 34. The acting surface 44 of the engagement recess 36 is assigned to the angular surface 40. When the convertible top hatch transmission part 12 moves with driving of the movement part 14, when the lock element 28 is engaged with the engagement recess 34 of the safety drive transmission part 16, the pairing of the angular surface 38 and the acting surface 42 causes the lock element 28 to engage the engagement recess 36 by the pairing of the angular surface 38 and the acting surface 42. This situation is shown in FIG. 2.

The analogous situation applies to the pairing of the angular surface 40 and the acting surface 44 in the motion of the safety drive transmission part 16 when the lock element 28 is first engaged to the engagement recess 36 of the convertible top hatch transmission part 12.

A projection 46 is formed on the lock element 28 which interacts with the fixing strip 48 of the guide rail 10. The projection 46 and the fixing strip 48 are dimensioned in their thickness with consideration of the possible displacement path of the lock element 28 such that the projection 46 in the case of engaging the lock element 28 with the engagement recess 34 with the first slide surface 50 slides along the first contact surface 52 of the fixing strip 48. However, if the lock element 28 is engaged to the engagement recess 36, the second slide surface 54 of the projection 46 which is opposite the first is in contact with the second contact surface 56 of the fixing strip 48. The fixing strip 48 and the projection 46 which adjoins prevents the lock element 28 from disengaging from the respective transmission part.

Figure 2:
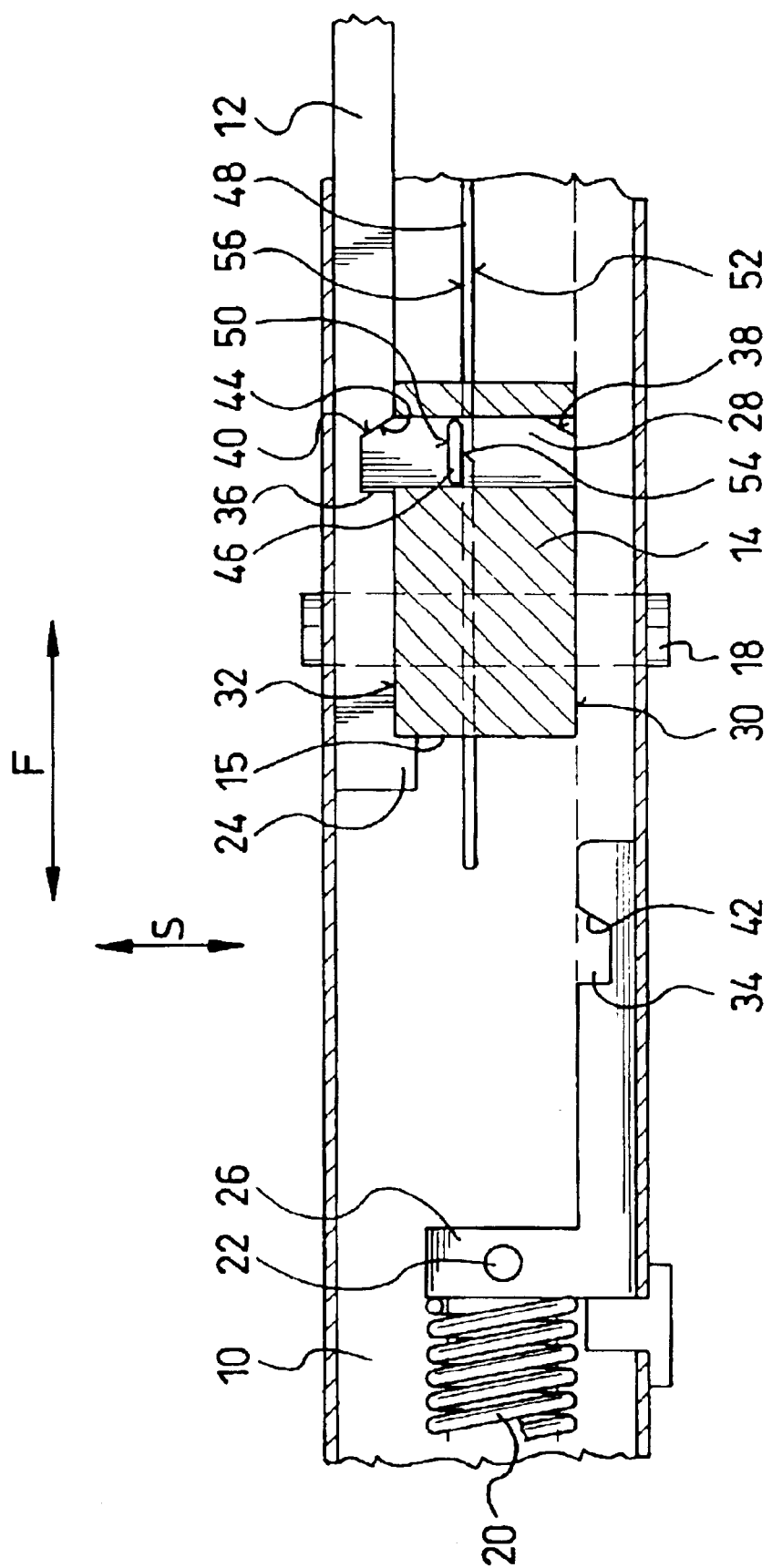

It is shown in FIG. 2 how the movement part 14 is entrained by the convertible top hatch transmission part 12 as it moves out of the first end position.

Figure 3:
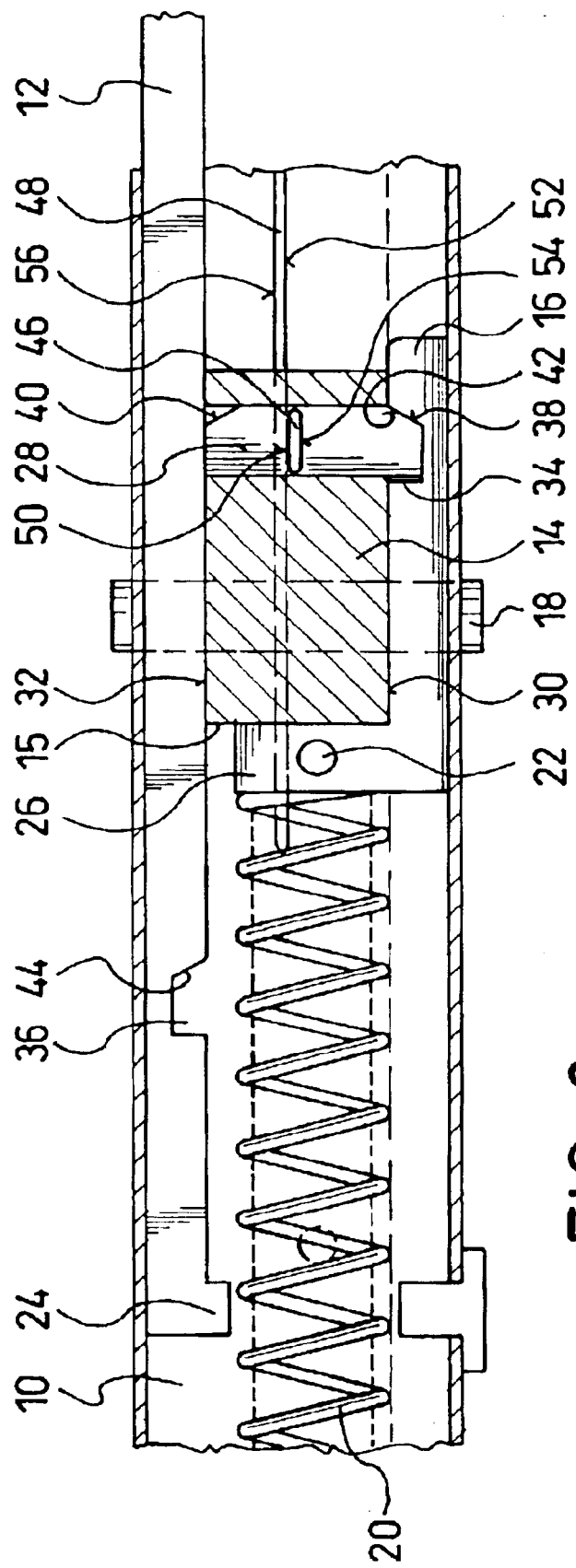

It is shown in FIG. 3 how the safety drive transmission part 16, under the action of the spring 20, is moved out of its first end position, and in doing so, entrains the movement part 14. Such a case occurs when the roll bar is suddenly triggered as a result of an extremely critical traffic situation and is moved into its protective position.

Figure 4:
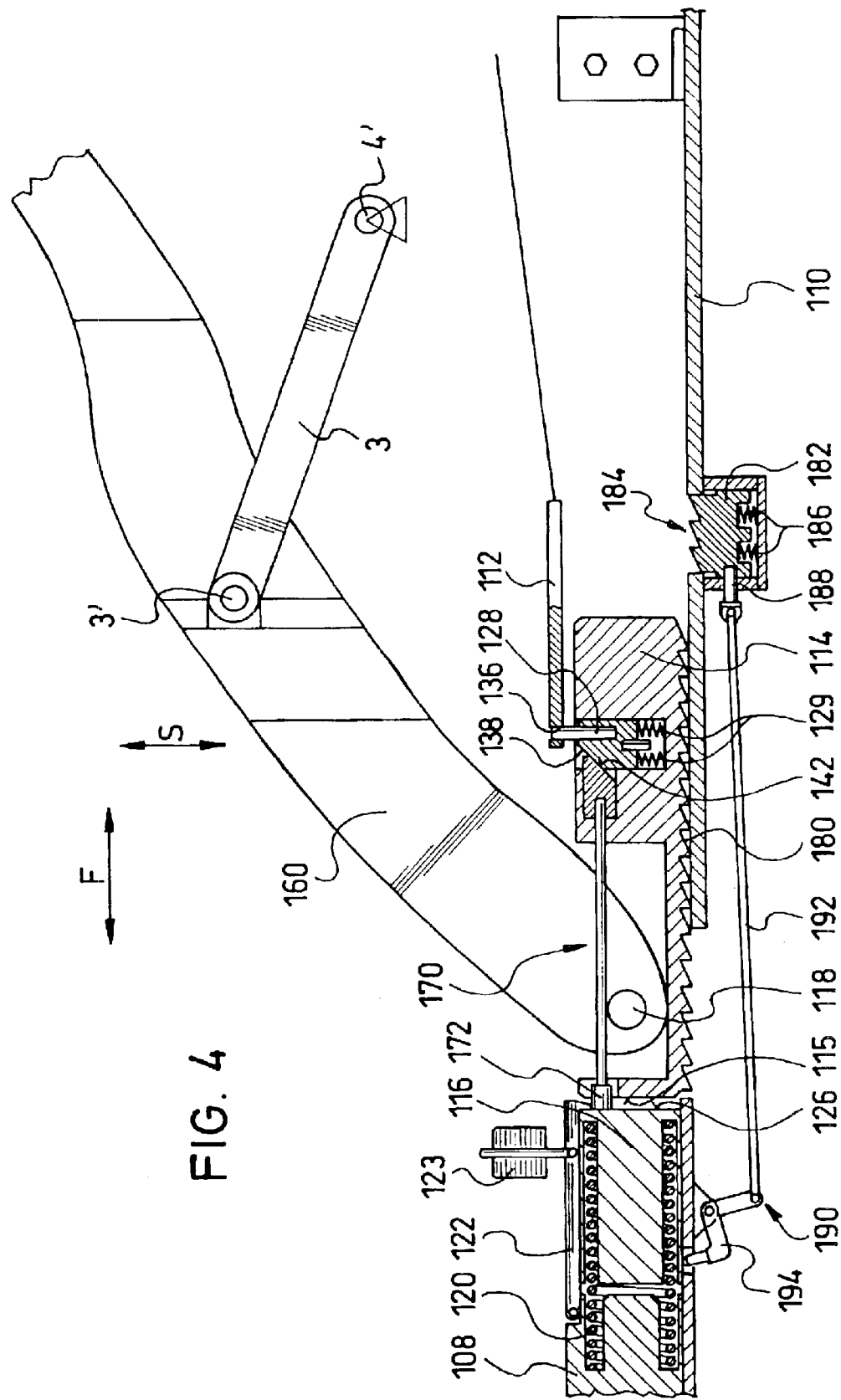
FIGS. 4 to 6 show three positions of a second embodiment of an arrangement in accordance with the invention with a convertible top hatch transmission part, a roll bar movement part and a safety drive transmission part.
Figure 5:
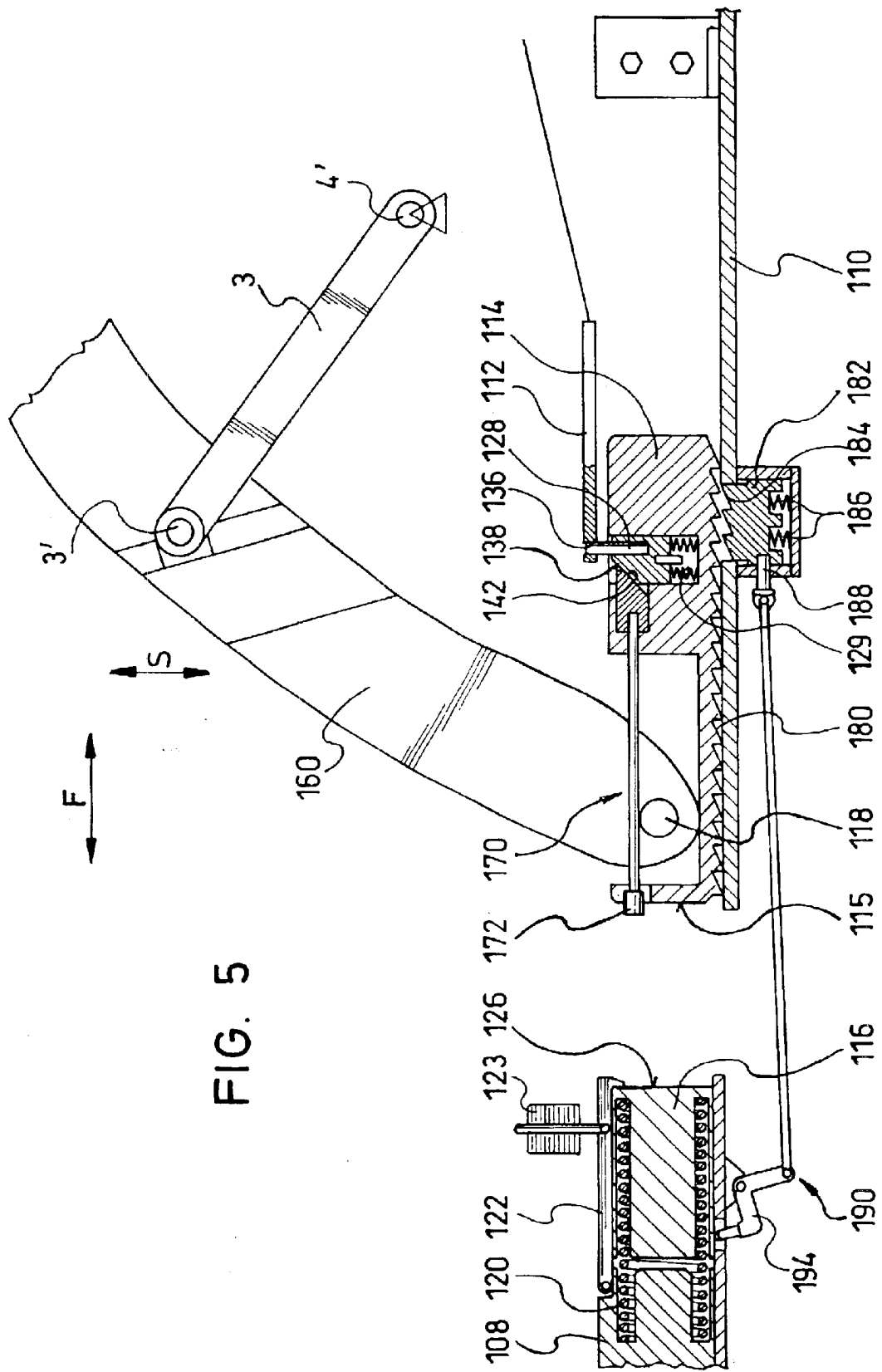
Figure 6:
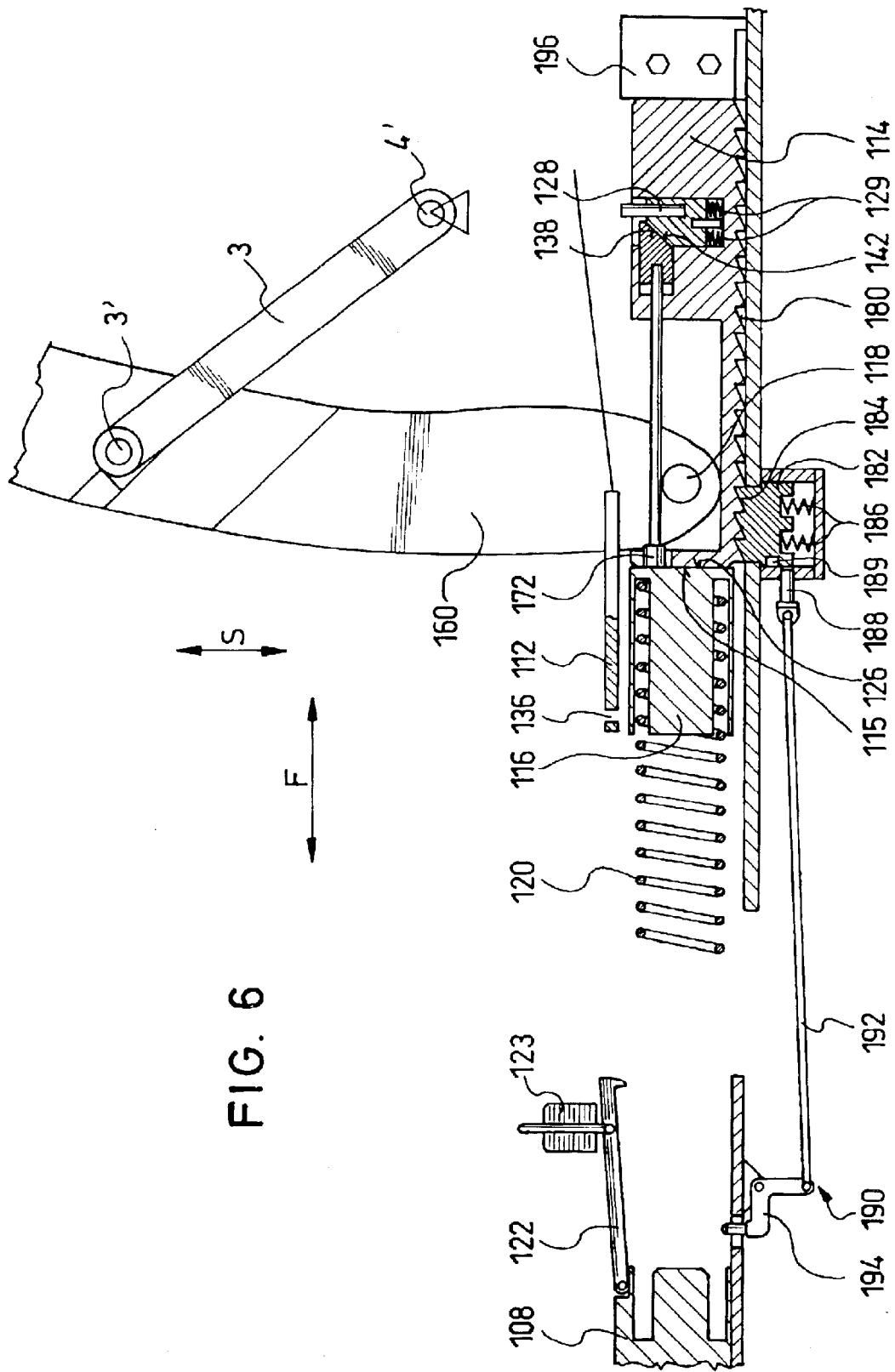

FIGS. 4 to 6 show a second embodiment which is alternative to the first embodiment shown in FIGS. 1 to 3. The component parts of the first and second embodiment which correspond to one another are provided in FIGS. 4 to 6 with the same reference numbers, but increased by 100. The second embodiment is described only to the extent that it differs form the first embodiment, otherwise reference is made expressly to the description of FIGS. 1 to 3. Otherwise, in FIGS. 4 to 6, a connecting rod which is connected to the roll bar 160 and joints which are assigned to it are labeled according to the embodiment shown in FIG. 9.

In FIG. 4, the convertible top hatch transmission part 112, the roll bar movement part 114 and the safety drive transmission part 116 are in their respective first end position. In it, the safety drive transmission part 116 is held by a locking hook 122 which can swivel around an axis which runs in the transverse direction of the vehicle. The locking hook 122 can, like the locking pin 22, be raised by a lifting magnet 123 so that the safety drive transmission part 116 is triggered for movement in the direction of its second end position, i.e., in FIG. 4 to the right. In order to prevent unintentional triggering of the safety drive, the locking hook 122 can be additionally tensioned by a spring (not shown) into its position shown in FIG. 4. The spring 120 of the safety drive is supported in a body-mounted spring bearing 108.

As shown in FIG. 4, the roll bar movement part 114 lies, in the direction of motion of the safety drive transmission part 116 towards its second end position, in front of the transmission part 116 so that its end face pointing towards the movement part 114 forms the driving means 126.

No driving means is made on the convertible top hatch transmission part 112 in this embodiment. Rather, the transmission part 112 is coupled to the movement part 114 for joint motion by the lock element 128 which is engaged to the engagement recess 136. The lock element 128 is pre-tensioned by two springs 129 into the engagement position shown in FIG. 4. If, at this point, the convertible top hatch transmission part 112 is driven to move the convertible top hatch (not shown), as a result of the described coupling, the roll bar movement part 114, and thus the roll bar 160, are moved at the same time.

On the roll bar movement part 114, there is a decoupling mechanism 170. It comprises the acting surface 142 which interacts with the angular surface 138 of the lock element 128 and as a result of the pre-tensioning force of the springs 129, adjoins it. On the end area of the roll bar movement part 114 which faces toward the safety drive transmission part 116, an actuating element 172 of the decoupling mechanism 170 projects relative to the end face 115 of the movement part 114 pointing toward the transmission part 116. Preferably, but not necessarily, it adjoins the end face 126 of the transmission part 116. The end faces 115, 126 are spaced apart from one another at a distance which is chosen such that, when the safety drive transmission part 116 is triggered, it first pushes the actuating element 172 into the movement part 114. Thus, the interaction of the acting surface 142 with the angular surface 138 pulls the lock element 128 out of the engagement opening 136 against the action of the springs 129 and releases the coupling to the convertible top hatch transmission part 112. The distance of the end faces 115, 126 therefore follows essentially from the penetration depth of the lock element 128 into the engagement recess 136 and the angular position of the surfaces 138, 142 with respect to the direction of motion S of the lock element.

Then, as soon as the end face 126 adjoins the end face 115 of the movement part 114, the movement part 114, which has been decoupled from the transmission part 112, is driven by the transmission part 116 to move. The roll bar 160 is suddenly moved from its lowered position into the protective position. As in the first embodiment, here, the safety drive transmission part 116 can also release the coupling between the convertible top hatch transmission part 112 and the roll bar movement part 114, not only in its first end position, but in each intermediate position, and drives the roll bar movement part 114 itself.

On the bottom of the roll bar movement part, teeth 180 are formed such that the tooth flanks facing toward the second end position are positioned with a comparatively flat angle against the direction of motion F, while the tooth flanks facing toward the first end position of the movement part 114 are located essentially orthogonally to the direction of motion F. Furthermore, in a recess in the guide rail 110, there is a pull-back blocking part 182 which, on its side facing towards the movement part 114, has teeth 184 which are made complementary to the teeth 180 of the movement part 114. The pull-back blocking part 182 is locked by a pin 188 against the tension force of two springs 186 in the pull-back release position. In the pull-back release position, the teeth 184 are positioned such that the movement part 114 can slide away over it without the teeth 180, 184 coming into contact with one another.

The pin 188 is held against the pre-tensioning force of a spring (not shown) in its position which locks the pull-back blocking part 182. A transmission rod 190, which is formed from a forcing lever 192, and a rocker arm 194 prevents the pin 188 from being decoupled from the position shown in FIG. 4 by spring force. The free end of the rocker arm 194 adjoins one side of the safety drive transmission part 116. The pin 188 is thus prevented from moving to unlock the pull-back blocking part 182 until the transmission part 116 has moved to its second end position insofar as the rocker arm 194 no longer adjoins its side and can turn clockwise.

FIG. 5 shows the position of the roll bar-convertible top hatch system similar to that of FIG. 2. To move the convertible top hatch, the convertible top hatch transmission part 112 is moved and driven in the direction of the double arrow F, more precisely to the right in FIG. 5. By the lock element 128, which is inserted into the engagement recess 136 of the transmission part 112, the roll bar movement part 114 is moved by the convertible top hatch transmission part 112 at the same time.

FIG. 6 shows a situation similar to FIG. 3, i.e., the safety drive for the roll bar 160 has been triggered. The hook 122 has been raised by the lifting magnet 123, whereupon the safety drive transmission part 116 has been driven by the spring 120 in the direction of the double arrow F, more accurately to the right in FIG. 6. First, the actuating element 172 is pressed into the movement part 114 in the direction of motion of the transmission part 116. As a result of the consequent displacement of the acting surface 142, the lock element 128 is pulled out of the engagement opening 136 by the interaction of the angular surface 138 and the acting surface 142 in the direction of the double arrow S, more accurately downward in FIG. 6. Then, the end faces 115, 126 engage one another, whereupon the roll bar movement part, driven by the transmission part 116, is moved into its second end position shown in FIG. 6. In this position, the movement part 114 adjoins the end stop 196.

After the safety drive transmission part 116 has been moved to the right out of its first end position so far that the free end of the rocker arm 194 is no longer supported by the transmission part 116, the pin 188 is withdrawn from the engagement recess 189 in the pull-back blocking part 182 by the spring (not shown) which pre-stresses it. The pull-back blocking part 182 thereupon moves, driven by the springs 186, in the direction of the double arrow S, more accurately upward in FIG. 6, and now projects beyond the slide plane of the guide rail 110. Based on the described execution of the teeth 180, 184 in the movement part 114 and in the pull-back blocking part 182, motion of the movement part 114 toward the second end position is possible but movement in the direction toward the first end position, however, is hindered by the tooth flanks which are almost orthogonal relative to the direction of motion F and which adjoin one another. For releasing the roll bar 160 from the protective position shown in FIG. 6, first the pull-back blocking part 182 must first be moved into its pull-back release position again and locked there by the pin 188. The pull-back block which is shown prevents the roll bar 160 from being able to be forced back into the lowered position by the kinetic energy of the impact of a vehicle in overturning.

In FIGS. 7 to 10, different embodiments of a roll bar 60 for use in a motor vehicle in accordance with the invention are shown. Here FIGS. 7*a* to 10*a* each show connecting rod diagrams of the respective roll bar 60, while FIGS. 7*b* to 10*b* each show schematic perspectives of the roll bar.

In all of FIGS. 7 to 10, the roll bars are labeled 60, the cross brace of the roll bar 60 is labeled 60*a* and the leg of the roll bar 60 which leads from the cross brace to the coupling point on the vehicle body is labeled 60*b*. In FIGS.

7a to 10a, moreover, the trajectory of the cross brace 60a which is always projected there onto one point when the roll bar moves is labeled 62.

In FIGS. 7 to 10 the joints are labeled with single-digit numbers with apostrophes and the connecting rods connected to the joints are labeled with single-digit numbers in a circle.

Figure 7A:
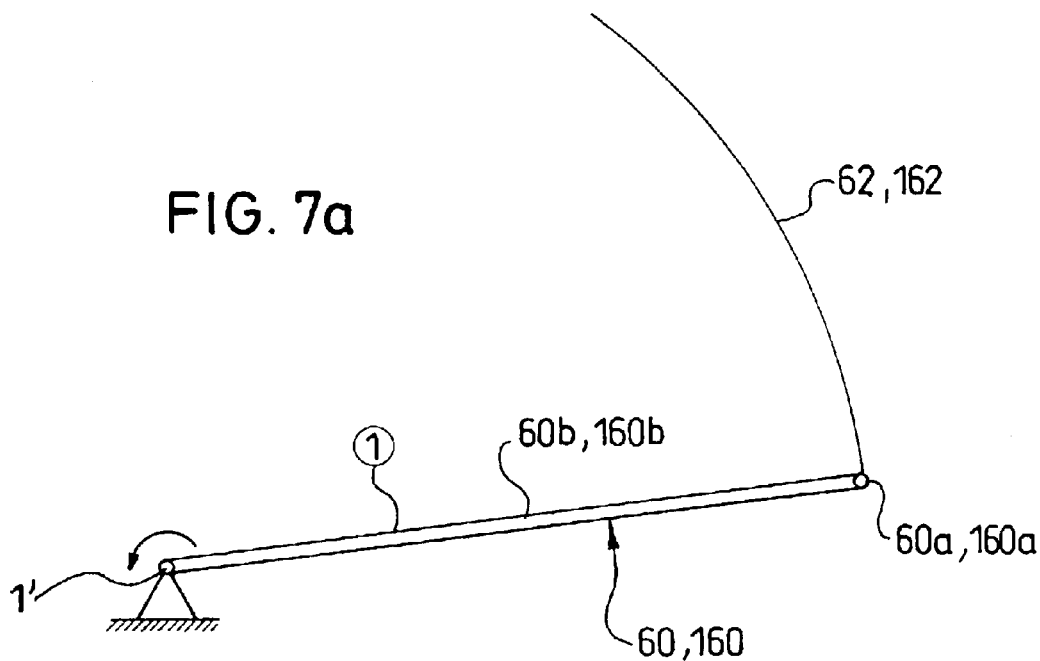
Figure 7B:
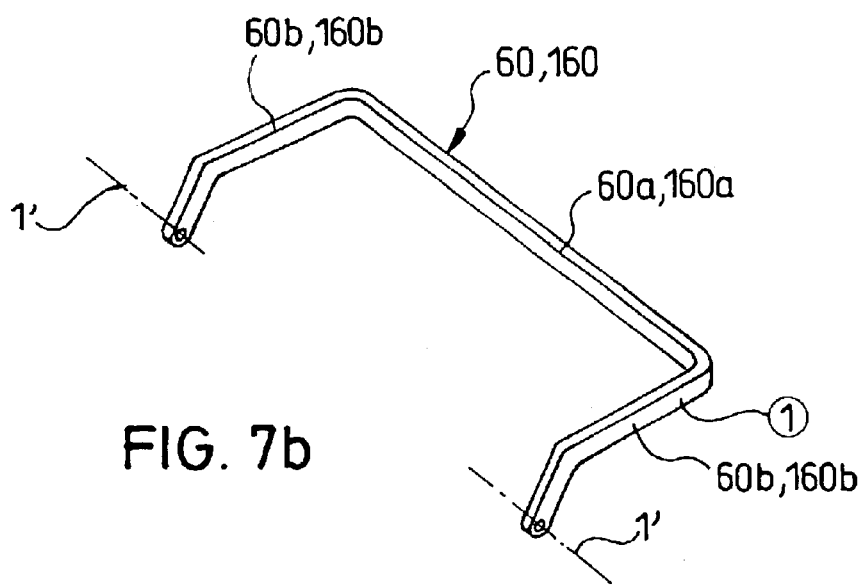

FIG. 7 shows the simplest case of a roll bar which is coupled directly by its legs 60b to the vehicle body via a joint 1'. The trajectory 62 of the cross brace 60a when the roll bar is moved corresponds to a circle in the projection of FIG. 7a.

Figure 8A:
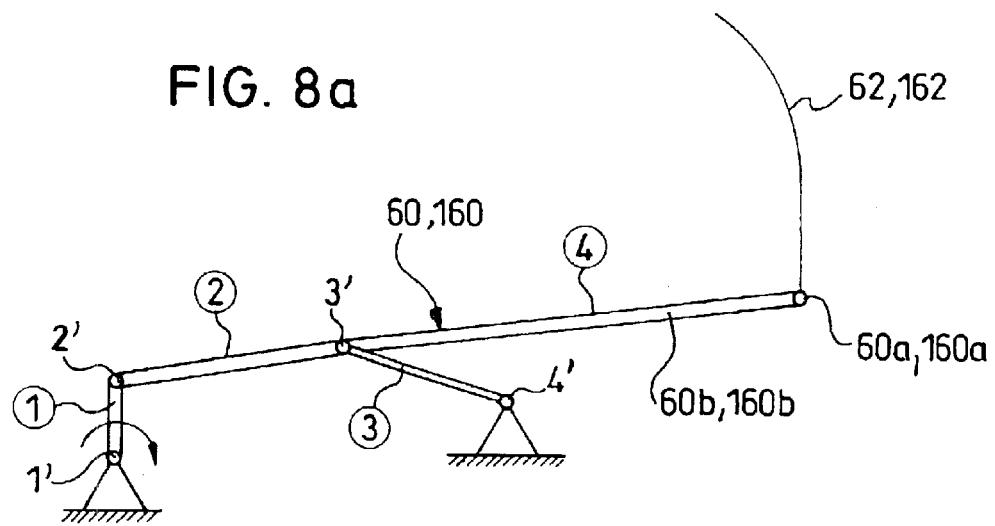
Figure 8B:
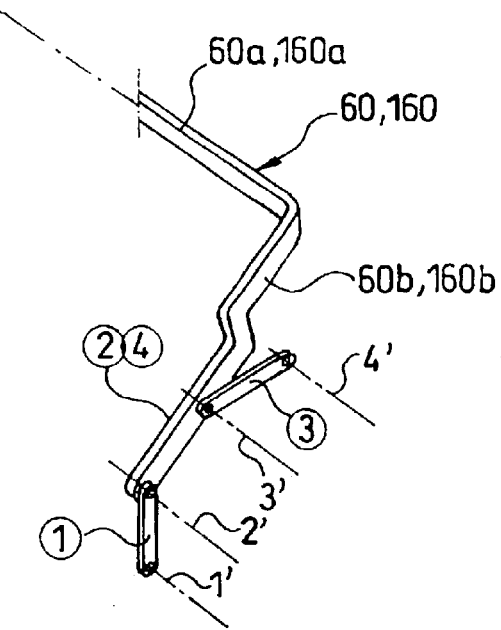

In FIG. 8, the leg 60b of the roll bar 60 is formed by the connecting rods 2, 4 which are rigidly connected to one another. The free lengthwise end of the leg 60b is connected via the joint 2' to the driving connecting rod 1 which in turn is coupled via a joint 1' to the vehicle body. In addition, the leg 60b, for guidance of the motion of the roll bar 60, is connected to the connecting rod 3 at the coupling point 3' in the area of the lengthwise center of the leg 60b which is, however, pushed slightly towards the joint 2'; the rod 3 is coupled on its other lengthwise end via a joint 4' to the vehicle body.

As the trajectory 62 in FIG. 8a shows, the advantage of this construction is that the cross brace 60a first moves essentially vertically up out of the rest position of the roll bar 60, by which, for example, head supports can be easily bypassed.

Figure 9A:
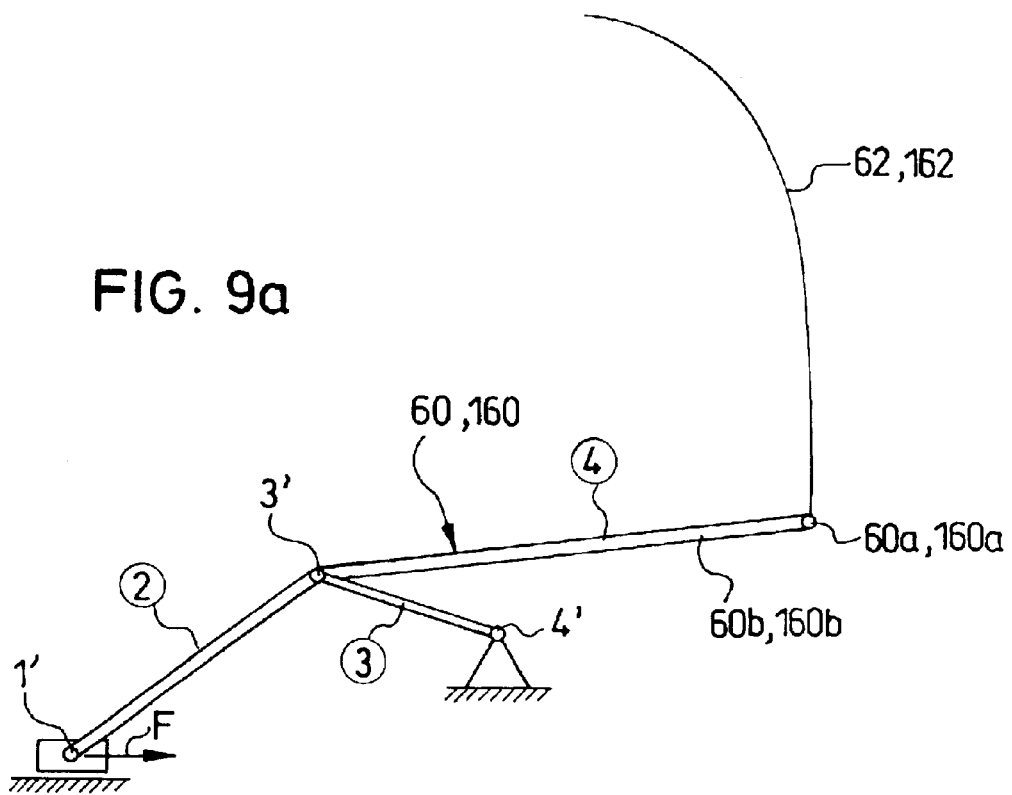
Figure 9B:
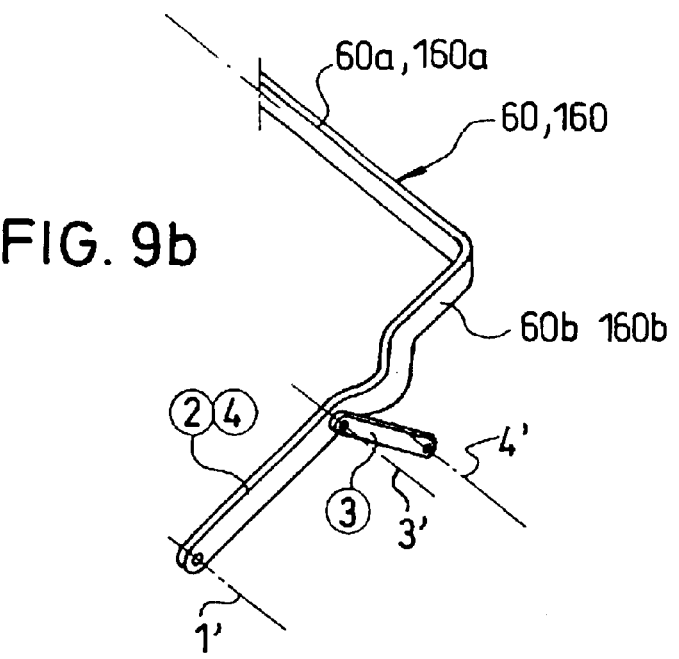

A similar action is achieved with the construction shown in FIG. 9. The construction shown in FIG. 9 corresponds essentially to the one shown in FIG. 8, but the connecting rod 1 is replaced by a slideway which runs in the lengthwise direction of the vehicle. Otherwise, reference is made to the description of FIG. 8 for the explanation of FIG. 9. The slideway shown in FIG. 9a can be executed in detail, for example, in the manner shown in FIGS. 1 to 3 or also in the manner shown in FIGS. 4 to 6.

Figure 10A:
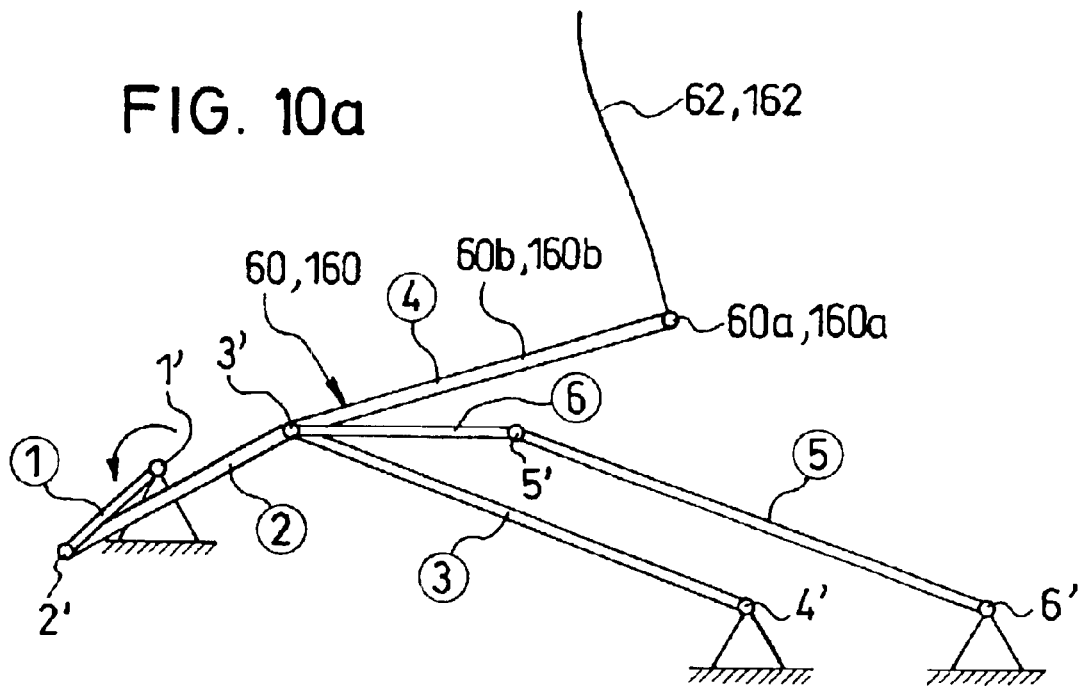
Figure 10B:
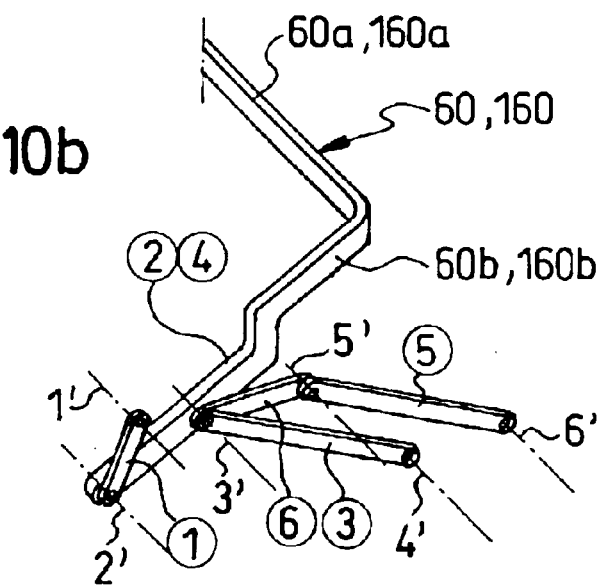

FIG. 10 corresponds essentially likewise to the embodiment shown in FIG. 8; reference is made expressly to its description here. In addition, in the alternative shown in FIG. 10, the joint 3' is coupled to a connecting rod 6 which, in turn, is connected at the joint 5' to the connecting rod 5 which, in turn, is connected to the vehicle body via a joint 6'. In addition, the coupling point 1' of the driving connecting rod 1 on the body, with reference to the coupling point 4' of the connecting rod 3, is chosen to be elsewhere than in FIG. 8a; this leads to the trajectory 62 of the cross brace 60a which is shown in FIG. 10a as being essentially vertical.

The features of the invention disclosed in the above description, in the drawings and in the claims can be important to the accomplishment of the invention both individually and also in any combination.

What is claimed is:

1. A convertible top hatch and roll bar operating assembly for cabriolet vehicle by which a convertible top hatch is movable between a cover position and an open position for selectively covering and opening a convertible top compartment of a cabriolet vehicle and by which a roll bar is movable between a lowered position and a protective position, comprising a convertible top hatch transmission part for transferring a driving force to a convertible top hatch in an installed use state thereof, a roll bar, a roll bar movement apparatus having roll bar movement part for moving said roll bar between the lowered and protective positions thereof, and a coupling mechanism for coupling the roll bar movement part to the convertible top hatch transmission part for movement in conjunction therewith, said coupling mechanism being disengageable for enabling movement of the roll bar movement part independent of the convertible top hatch transmission part.

2. Convertible top hatch and roll bar operating assembly in accordance with claim 1, wherein a movable lock element is provided for producing the coupling of the convertible top hatch transmission part to the roll bar movement part.

3. Convertible top hatch and roll bar operating assembly in accordance claim 1, wherein the coupling of the convertible top hatch transmission part to the roll bar movement part is operative when the convertible top hatch transmission part is moved in a direction for producing opening of the convertible top hatch.

4. Convertible top hatch and roll bar operating assembly in accordance with claim 1, wherein the convertible top hatch transmission part is movable between a first end position which is assigned to the cover position and a second end position assigned to the open position, wherein the roll bar movement part is movable between a first end position assigned to the lowered position and a second end position which is assigned to the protective position, and further comprising a safety drive for the roll bar having a safety drive transmission part which is movable between a first end position which corresponds to a readiness position of the safety drive for the roll bar and a second end position which corresponds to an activation position of the safety drive, wherein the transmission parts and the roll bar movement part are movable at least some distance with the same type of motion and the same direction of motion in movement in a direction from their first end position toward their second end position.

5. Convertible top hatch and roll bar operating assembly in accordance claim 4, wherein, on at least one of the convertible top hatch transmission part and the safety drive transmission part, there is a respective driving means for driving the roll bar movement part with movement of the respective transmission part in the direction toward the second end position.

6. Convertible top hatch and roll bar operating assembly in accordance claim 4, wherein a movable lock element is provided for producing the coupling of the convertible top hatch transmission part to the roll bar movement part, said lock element being provided on the roll bar movement part.

7. Convertible top hatch and roll bar operating assembly in accordance claim 4, wherein a movable lock element is provided for producing the coupling of the convertible top hatch transmission part to the roll bar movement part; and wherein the lock element can be moved between engagement with the safety drive transmission part and engagement with the convertible top hatch transmission part.

8. Convertible top hatch and roll bar operating assembly in accordance claim 4, wherein a movable lock element is provided for producing the coupling of the convertible top hatch transmission part to the roll bar movement part, and wherein, on the lock element, there is at least one gear mechanism by which movement of at least one of the roll bar movement part and the safety drive transmission part can be stepped up into motion which moves the lock element.

9. Convertible top hatch and roll bar operating assembly in accordance claim 8, wherein at least one angular surface is provided on the lock element, each angular surface being assigned to a respective transmission part, a surface normal of the at least one angular surface having a directional component which is parallel to a direction of motion of the lock element and a directional component parallel to a direction of motion of the roll bar movement part out of its first end position.

10. Convertible top hatch and roll bar operating assembly in accordance claim 9, wherein at least one of the safety drive transmission part and the roll bar movement part has an acting surface for interaction with at least one angular surface of the lock element for moving the lock element.

11. Convertible top hatch and roll bar operating assembly in accordance claim 10, wherein at least one angular surface is provided on the lock element, and wherein a fixing means is provided for fixing the lock element during motion of the roll bar movement part in a respective engagement position.

12. Convertible top hatch and roll bar operating assembly in accordance claim 11, wherein the fixing means comprises a plurality of slide surfaces which run in the direction of motion of the roll bar movement part.

13. Convertible top hatch and roll bar operating assembly in accordance claim 11, wherein the fixing means is formed by spring elements which tension the lock element into its engagement position.

14. Convertible top hatch and roll bar operating assembly in accordance claim 4, further comprising a pull-back blocking part which, when the safety drive transmission part is not triggered, is locked in a pull-back release position in which it allows motion of the roll bar movement part in the direction toward the first end position thereof, and which is unlocked by motion of the safety drive transmission part from its first end position toward its second end position for movement into a pull-back blocking position in which it does not allow movement of the roll bar movement part in the direction toward the first end position.

15. Convertible top hatch and roll bar operating assembly in accordance claim 14, wherein the pull-back blocking part is pre-tensioned by a spring in a direction toward the pull-back blocking position and wherein the pull-back blocking part is locked against the pre-tensioning of the spring in the pull-back release position.

16. Convertible top hatch and roll bar operating assembly in accordance claim 15, wherein the safety drive transmission part, in its first end position, is coupled via a force transmission means to the pull-back blocking part in its pull-back release position.

17. Convertible top hatch and roll bar operating assembly in accordance claim 16 wherein said force transmission means is one of a gearing and a rod.

18. Convertible top hatch and roll bar operating assembly in accordance claim 1, wherein the convertible top hatch transmission part and the roll bar movement apparatus are adapted to produce a roll bar movement, simultaneously with motion of the convertible top hatch, in a direction of motion which is different from the direction of motion of the convertible top hatch during at least one segment of the motion of the convertible top hatch.

* * * * *